United States Patent [19]

Aiudi et al.

[11] Patent Number: 5,152,350
[45] Date of Patent: Oct. 6, 1992

[54] IMPLEMENT FOR USE IN CONJUNCTION WITH A TOWEL FOR RAKING AND FOR ANCHORING THAT TOWEL TO THE GROUND

[76] Inventors: Rugero W. Aiudi, Box 87, Westbrook, Conn. 06498; David M. Aiudi, 1 Diamond Ter., Plainville, Conn. 06062

[21] Appl. No.: 775,544

[22] Filed: Oct. 15, 1991

[51] Int. Cl.⁵ ............................................. A01D 7/00
[52] U.S. Cl. .................................. 172/378; 56/400.04; 248/156; 248/508
[58] Field of Search ............... 172/371, 375, 438, 378; 56/400.04, 400.01, 400.14; 248/156, 530, 545, 508

[56] References Cited

U.S. PATENT DOCUMENTS

| | | | |
|---|---|---|---|
| 2,840,092 | 6/1958 | Hill | 248/508 X |
| 3,367,093 | 2/1968 | Zwickel | 56/27 |
| 4,026,094 | 5/1977 | Sasur | 56/400.04 |
| 4,054,313 | 10/1977 | Ciuci | 294/53.5 |
| 4,699,165 | 10/1987 | Barzana | 248/508 X |
| 4,774,804 | 10/1988 | Sands | 56/400.04 |
| 4,927,118 | 5/1990 | Pierorazio | 248/156 X |

FOREIGN PATENT DOCUMENTS 1015922  8/1977  Canada ............................. 248/508

Primary Examiner—Randolph A. Reese
Assistant Examiner—Jeffrey L. Thompson
Attorney, Agent, or Firm—Terry M. Gernstein

[57] ABSTRACT

An implement can be releasably attached to a towel to be used as a rake to smooth sand and as an anchor to anchor the towel to the ground. The implement includes a spring-biased clamp that is releasably attached to the towel adjacent to one edge of that towel and a mounting ring on a base bar. A multiplicity of ground engaging teeth are mounted on the base bar as is a mounting ring. The mounting ring engaging ring releasably engages the mounting ring to attach the base bar to the towel via the spring-biased clamp. One form of the base bar includes a plurality of sections that telescopically connect together.

11 Claims, 2 Drawing Sheets

IMPLEMENT FOR USE IN CONJUNCTION WITH A TOWEL FOR RAKING AND FOR ANCHORING THAT TOWEL TO THE GROUND

TECHNICAL FIELD OF THE INVENTION

The present invention relates to the general art of ground-engaging implements, and to the particular field of anchoring devices.

BACKGROUND OF THE INVENTION

Nearly everyone who visits a lake or sea shore rests on a beach at one time or another. Most people spread a beach towel over the sand and lie on that towel. Many people find this to be quite restful, but others have experienced problems.

One problem is associated with an uneven or lumpy sand surface. A lumpy sand surface can be quite uncomfortable. therefore, many people use their feet or hands to smooth the sand surface. This works well, but could be improved.

Therefore, there is a need for an implement that can be used to smooth beach sand surfaces in an efficient and expeditious manner.

While such an implement will be beneficial, many people carry so many items to the beach that adding another implement will be cumbersome and may even deter some people from using the device.

Therefore, there is a need for an implement that can be used to smooth beach sand surfaces in an efficient and expeditious manner yet which will not be burdensome to carry and store.

A second problem is associated with the wind and breezes commonly encountered at the beach. Such wind and breeze often catch a blanket or towel and moves that blanket or towel.

While the art contains anchor devices that can be used in conjunction with beach towels to anchor such towels to the sand, these anchors are often ineffective since wind can still get beneath an anchored towel. Still further, many of the known anchors are difficult to carry, store and use, and often represent still further equipment for an already overloaded beach goer to carry and keep up with.

Therefore, there is a need for a beach towel anchoring means that is effective without being overly burdensome to carry, store and use.

OBJECTS OF THE INVENTION

It is a main object of the present invention to provide a device for use with a beach towel to anchor that towel in place.

It is another object of the present invention to provide a device for use with a beach towel to anchor that towel in place, yet is efficiently stored, carried and used.

It is another object of the present invention to provide a rake device for smoothing sand.

It is another object of the present invention to provide a rake device for smoothing sand that is efficiently carried, stored and used.

SUMMARY OF THE INVENTION

These, and other, objects are achieved by a rake implement that can be releasably attached to a beach towel in a manner that permits the towel to be used as a rake and in a manner that securely anchors the towel to the sand so that gusts of wind will not be able to get under the towel.

The implement includes clamps that can be releasably attached to a towel adjacent to a side edge of that towel, and which are releasably attached to rings on a rake-like device. The implement has a length that is essentially equal to the length of a long side edge of a rectangular towel. The rake-like device includes a multiplicity of teeth that are embedded into the sand to securely anchor the towel to the sand. Being anchored for essentially the entire length of the towel, secures the towel in a manner such that gusts of wind are not likely to get under the blanket. Also, by being secured to the towel for essentially the entire length of the towel, the towel and attached rake-like device can be used together to smooth the sand in an efficient operation.

One form of the implement includes a base bar that includes a plurality of sections telescopingly attached together so the length of the rake-like device can be altered as necessary. This will permit the rake-like device to be used in conjunction with towels of various lengths, or on the short end edges of rectangular towels, or to be attached to only a portion of the length of a towel.

By being so designed, the implement of the present invention can be used for a plurality of functions thereby making it versatile and overcoming the drawbacks of requiring a user to carry additional items to the beach. Furthermore, the collapsible form of the implement makes it easy to carry and store thus further overcoming many drawbacks to present devices.

BRIEF DESCRIPTION OF THE DRAWING FIGURES

DETAILED DESCRIPTION OF THE PREFERRED EMBODIMENT OF THE INVENTION

Figure 1:
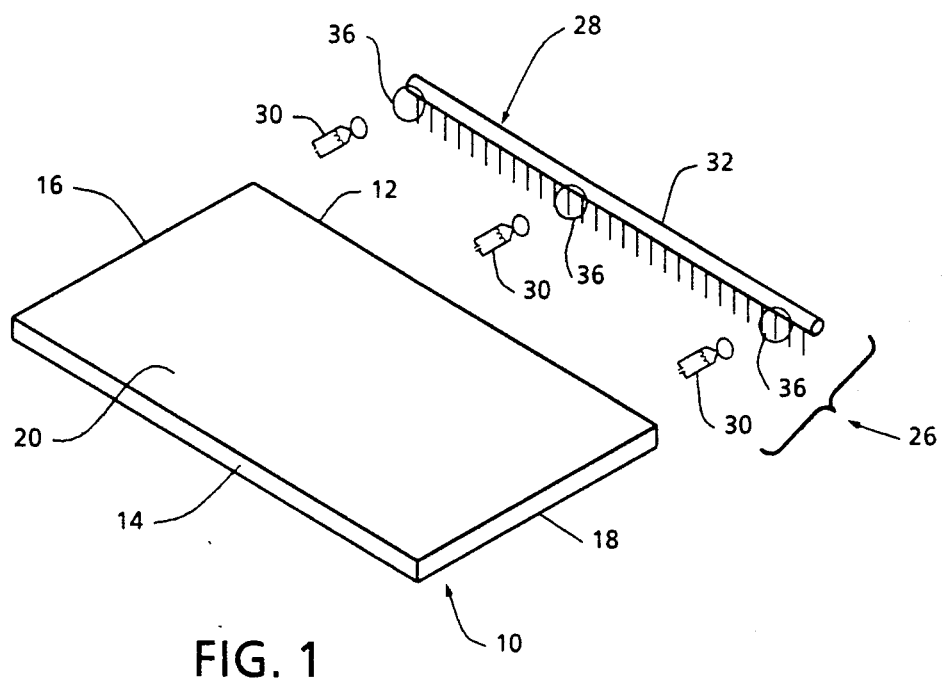
FIG. 1 is a perspective view of a blanket or towel in combination with an implement for anchoring that blanket or towel to the ground and for adapting that blanket or towel for use in smoothing sand.
Figure 2:
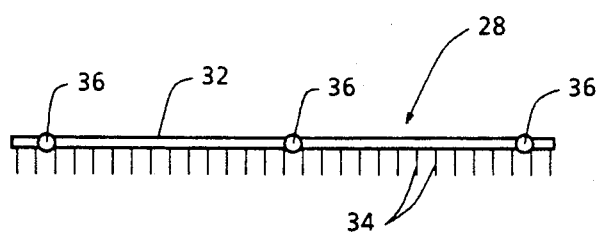
FIG. 2 is a side elevational view of the implement embodying the teaching of the present invention.

Shown in FIG. 1 is a blanket or towel 10 that is suitable for use on a beach. The towel 10 is rectangular and includes two side edges 12 and 14, and two end edges 16 and 18, with the side edges being longer than the end edges. The towel has two surfaces, a top surface 20 and a bottom surface 22 (see FIG. 3) that engages the top surface 24 of the sand or ground S. An implement 26 for adapting that towel 10 for use as a means for smoothing the sand and for anchoring that towel to the sand includes a rake-like portion 28 and spring-biased clamps, such as clamp 30. The implement is releasably attached to the towel adjacent to one edge thereof, with the preferred form of the combination having the implement attached to one of the side edges of the towel as shown in FIG. 1. However, the implement could be attached to one end edge if suitable.

Figure 3:
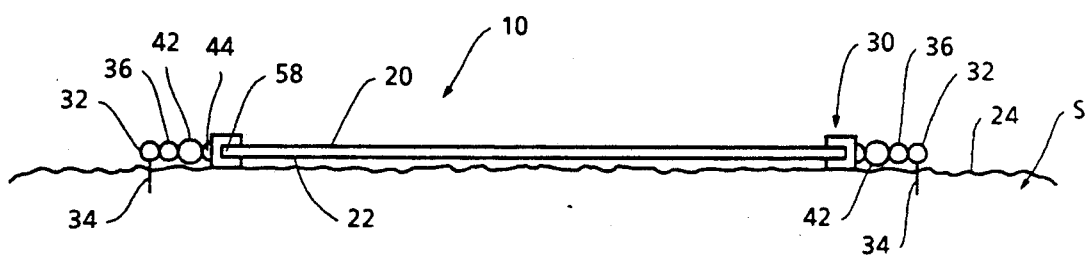
FIG. 3 is a side elevational view of a blanket or towel having the implement of the present invention attached thereto and anchored in a sand surface.

As best shown in FIGS. 1-4, the implement includes a base bar 32 having a multiplicity of comb-like or rake-like teeth, such as tooth 34, securely fixed thereto along the entire length thereof. The teeth are sized and spaced so they can be embedded into the sand as shown in FIG. 3 to either anchor the towel to the sand or to smooth the sand as the teeth are moved through the sand in the manner of a rake.

Figure 4:
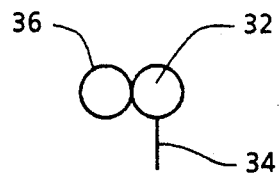
FIG. 4 is an end elevational view of the implement embodying the teaching of the present invention.

The implement further includes a plurality of mounting rings, such as mounting ring 36, fixed thereto to be spaced apart from each other along the length of the bar. The preferred form of the implement includes three rings, one adjacent to each end thereof and one near the middle thereof. However, other numbers of such rings can be used if suitable. Each ring is circular and is tangentially mounted to the base bar to be co-planar therewith as is best shown in FIG. 4. The coplanar orientation of the rings and the base bar permits the bar to engage the surface of the sand and hold the towel closely adjacent to the sand surface as is best indicated in FIG. 3. The teeth are oriented at right angles to the ring 36 so they can be firmly embedded into the ground.

Figure 5:
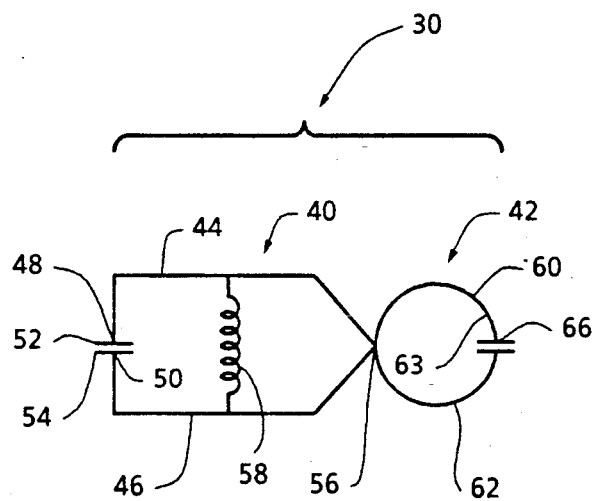
FIG. 5 is an elevational view of a spring-biased clamp that is used to releasably attach a rake-like implement to a beach towel or blanket.

One of the spring-biased clamps is shown in FIG. 5, and attention is now directed thereto. The clamp 30 includes a towel-engaging section 40 and a mounting ring-engaging section 42. The towel-engaging portion 40 includes two forceps-like prongs 44 and 46 that have distal ends 48 and 50 respectively, with towel-engaging plates 52 and 54 respectively located on those distal ends. The clamp also has a proximal end 56 at which the prongs intersect each other. An extension spring 58 has one end thereof fixed to prong 44 and another end thereof fixed to prong 46 and draws these two prongs together. The prongs are opened by forcing them apart using the proximal ends as a pivot. Once opened, the towel can be inserted between the prongs and the prongs can be released. The spring will draw the prongs together clamping them to the towel.

The mounting ring-engaging clamping ring 42 is circular and includes two prongs 60 and 62. Each of the prongs is connected at one end thereof to the proximal end 56 and has a distal end, such as distal end 64 of prong 60. A clamping plate, such as clamping plate 66 on prong 62, engages a clamping plate on the other prong. The clamping ring 42 is resilient and is biased to cause the clamping plates into abutting contact with each other by the natural resiliency of the ring material. The ring is opened by prying the ring prongs away from each other against the bias of the natural resiliency of the ring.

The clamping rings 42 are opened and inserted through the mounting rings 36 to attach the clamp elements 30 to the rake-like element. The clamp elements 30 are then attached to the towel as above discussed to attach the implement to the towel.

Once attached to the towel, the towel/implement combination can be used in the manner of a sand rake to smooth the sand before the towel is placed on the sand. The implement teeth are then embedded into the sand to anchor the towel to the sand as shown in FIG. 3. As above discussed, the towel can be used in conjunction with one implement, or with two or more implements. Two implements are shown in FIG. 3 anchoring the towel to the sand. As was also mentioned above, the implement can be attached to the end edge of the towel, with two implements being used. Therefore, if suitable one, two, three or four implements can be used to firmly anchor the towel to the sand.

Figure 6:
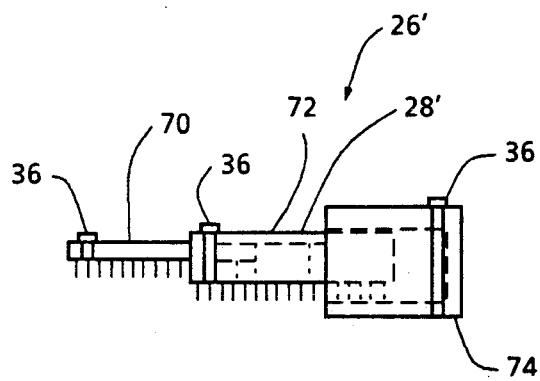
FIG. 6 is an elevational view of a collapsible form of the implement embodying the present invention.

An alternative form of the implement is shown in FIG. 6 as implement 26'. The implement 26' includes a base bar 28' having a plurality of sections, such as sections 70, 72 and 74 telescopingly connected together whereby section 70 slides into section 72, which, in turn, slides into section 74 to collapse the implement into a small package. As is shown in FIG. 6, section 72 has an internal bore 72B that is sized to accommodate the base bar and the teeth of section 70 and the section 74 has a bore 74B that is sized to slidably accommodate the base bar and teeth of section 72 whereby the entire implement 26' can be collapsed. This package can be wrapped in the towel and easily stored and carried. The telescoping nature of the implement 26' can be used to attach that implement to either the side or end edges of a towel, or to accommodate towels of various lengths or widths. Mounting rings 36 are fixed to the telescoping implement in the manner of the rings 36 discussed above in conjunction with the first form of the implement. Other than being collapsible, with the advantages incident thereto, the implement 26' operates in the manner discussed above with regard to the implement 26. Therefore, the operation of the implement 26' will not be discussed.

The implements 26 and 26' can be made of plastic, or can be metal if suitable.

It is understood that while certain forms of the present invention have been illustrated and described herein, it is not to be limited to the specific forms or arrangements of parts described and shown.

I claim:

1. An implement for use in conjunction with a towel for raking and for anchoring that towel to the ground comprising:
    A) a spring-biased clamp having two towel-engaging prongs for releasably attaching said spring-biased clamp to a towel, each prong including a distal end and a proximal end, with the prongs intersecting each other at the proximal ends thereof, a spring biasing said prongs toward each other so said prong distal ends are forced towards each other, and a clamping ring fixed to said prong proximal ends, said clamping ring having two prongs each of which includes a distal end that engages the other said clamping ring prong distal end of the clamping ring, said clamping ring having a natural resiliency that biases said clamping ring prong distal ends into abutting engagement with each other;
    B) a base bar having ends and a middle;
    C) a mounting ring fixed to said base bar, said clamping ring releasably engaging said mounting ring for releasably attaching said base bar to said spring-biased clamp; and
    D) a multiplicity of ground engaging teeth fixed to said base bar.

2. The implement defined in claim 1 wherein said mounting ring is coplanar with said base bar.

3. The implement defined in claim 2 wherein said teeth extend at right angles to said mounting ring.

4. The implement defined in claim 3 further including a plurality of said spring-biased clamps and a plurality of said mounting rings.

5. The implement defined in claim 4 wherein one mounting ring is located adjacent to one end of said base bar, a second mounting ring is located adjacent to another end of said base bar and a third mounting ring is located adjacent to the middle of said base bar.

6. The implement defined in claim 5 wherein said base bar includes a plurality of sections that are telescopingly connected to each other.

7. The implement defined in claim 6 wherein two of said plurality of sections have bores defined therein.

8. The implement defined in claim 7 wherein each of said bores is sized to slidably accommodate both a base bar and teeth of an adjacent section.

9. The implement defined in claim 1 further including a second base bar.

10. The implement defined in claim 9 wherein said second base bar includes a plurality of mounting rings, and further including a second plurality of spring-biased clamps for releasably attaching said second base bar to the towel.

11. The implement defined in claim 10 wherein each spring-biased clamp includes a spring located between said towel engaging prong distal ends and said proximal ends.

* * * * *